US010611484B2

(12) United States Patent
Demary et al.

(10) Patent No.: US 10,611,484 B2
(45) Date of Patent: Apr. 7, 2020

(54) PASSENGER SEAT ARRANGEMENT, PASSENGER SEAT SYSTEM AND AIRCRAFT CABIN REGION HAVING A PASSENGER SEAT ARRANGEMENT

(71) Applicant: Airbus Operations GmbH, Hamburg (DE)

(72) Inventors: Michael Demary, Meckenheim (DE); Bernd Ehlers, Hamburg (DE); Stefan Behrens, Boenningstedt (DE); David Toth, Cologne (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 16/119,284

(22) Filed: Aug. 31, 2018

(65) Prior Publication Data
US 2019/0071181 A1 Mar. 7, 2019

(30) Foreign Application Priority Data
Sep. 4, 2017 (DE) .................. 10 2017 120 261

(51) Int. Cl.
B64D 11/06 (2006.01)
A01K 1/02 (2006.01)
A61G 3/08 (2006.01)
(52) U.S. Cl.
CPC ........ B64D 11/0639 (2014.12); A01K 1/0245 (2013.01); B64D 11/0612 (2014.12);
(Continued)

(58) Field of Classification Search
CPC ............ B64D 11/06; B64D 2011/0092; B64D 11/0691; B64D 11/00; B64D 11/0015; B64D 11/0629; A61G 5/00; A61G 5/08
See application file for complete search history.

(56) References Cited

U.S. PATENT DOCUMENTS 3,594,037 A    7/1971  Sherman et al.
3,861,747 A *  1/1975  Diamond ............... A47C 7/024
                                              297/452.49
(Continued)

FOREIGN PATENT DOCUMENTS

CN      102848943 A     1/2013
DE    102009056188 A1   6/2011
(Continued)

OTHER PUBLICATIONS

German Search Report; priority document.

Primary Examiner — Shin H Kim
(74) Attorney, Agent, or Firm — Greer, Burns & Crain, Ltd.

(57) ABSTRACT

A passenger seat arrangement for installation in an aircraft comprises at least one seating unit comprising a backrest element and a seat element pivotable relative to the backrest element between a resting position and a position of use. The passenger seat arrangement also has a support frame which bears against the at least one seating unit and which is able to be connected in a load-bearing manner to a structure of the aircraft. The support frame has at least one mechanical interface which, in each case, is assigned to a seating unit and is designed to fasten different mutually exchangeable modular units in a releasable and load-transmitting manner to the support frame.

20 Claims, 12 Drawing Sheets

(52) U.S. Cl.
CPC ...... *B64D 11/0696* (2013.01); *B64D 11/0698* (2014.12); *A61G 3/0808* (2013.01); *A61G 2220/10* (2013.01)

(56) References Cited

U.S. PATENT DOCUMENTS

| | | | |
|---|---|---|---|
| 4,640,525 A | | 2/1987 | Jensen et al. |
| 7,520,468 B2 * | | 4/2009 | Doebertin ............ A63H 33/008 244/118.5 |
| 10,086,766 B2 * | | 10/2018 | Osterhoff ............... B60N 2/682 |
| 2008/0272629 A1 * | | 11/2008 | Walkingshaw ........ A61G 1/013 297/118 |
| 2010/0051746 A1 | | 3/2010 | Law |
| 2012/0119551 A1 * | | 5/2012 | Brncick et al. ........ B60N 2/643 297/284.2 |
| 2012/0292953 A1 | | 11/2012 | Kunze et al. |
| 2014/0339364 A1 | | 11/2014 | Elhers et al. |
| 2018/0099752 A1 | | 4/2018 | Johnson et al. |
| 2018/0359985 A1 * | | 12/2018 | Jung ................... A01K 1/0035 |

FOREIGN PATENT DOCUMENTS

| | | | |
|---|---|---|---|
| DE | 102013008289 A1 | 11/2014 | |
| DE | 102016203593 A1 | 5/2017 | |
| FR | 2952613 A1 | 5/2011 | |
| JP | 2005245388 A | 9/2005 | |
| WO | 2016157081 A1 | 10/2016 | |

\* cited by examiner

PASSENGER SEAT ARRANGEMENT, PASSENGER SEAT SYSTEM AND AIRCRAFT CABIN REGION HAVING A PASSENGER SEAT ARRANGEMENT

CROSS-REFERENCES TO RELATED APPLICATIONS

This application claims the benefit of the German patent application No. 10 2017 120 261.7 filed on Sep. 4, 2017, the entire disclosures of which are incorporated herein by way of reference.

BACKGROUND OF THE INVENTION

The present invention relates to a passenger seat arrangement for installation in an aircraft, a passenger seat system having such a passenger seat arrangement and an aircraft cabin region provided with such a passenger seat arrangement.

The configurability of passenger cabins is a requirement for passenger aircraft which is becoming increasingly relevant. This configurability is designed to permit a customization and adaptation of passenger cabins to the respective type of use of the aircraft, for example as a short-haul, medium-haul or long-haul aircraft, and to the passengers to be transported. The equipment, which is required for the respective uses and which has to be carried in stowage areas of the passenger aircraft provided therefor, varies according to the type of use of the passenger aircraft and the people to be transported.

SUMMARY OF THE INVENTION

An object of the invention is to provide a flexible means for receiving equipment in a passenger cabin of an aircraft, this means being able to be configured in a simple manner and efficiently utilizing the space available in the passenger cabin.

A passenger seat arrangement according to the invention is provided for installation in an aircraft, in particular in a passenger cabin of the aircraft. Passenger cabins are generally provided with a plurality of seat rows which are arranged one behind the other and adjacent to one another in a longitudinal direction of the aircraft and which in each case provide a plurality of seats, for example three or four seats for passengers of the aircraft. The passenger seat arrangement proposed here comprises at least one seating unit, a passenger being able to be seated thereon during the operation of the aircraft. Preferably, the passenger seat arrangement comprises a plurality of seating units, for example three or four seating units, and forms a seat row of the passenger cabin. In a state installed in the aircraft, the passenger seat arrangement is preferably installed in a longitudinal direction of the aircraft to the rear of or between seat rows in a passenger cabin.

The at least one seating unit comprises a backrest element and a seat element which is pivotable relative to the backrest element between a resting position and a position of use. In the present case a "resting position" of the seat element is understood as a position in which the seat element is stowed, in particular is stowed in a space-saving manner. In this position it is not provided that a passenger is able to be seated on the seating unit. Accordingly, a "position of use" of the seat element is understood as a position in which the seat element is opened up so that a passenger is able to be seated thereon.

More specifically, the seat element may comprise a seat surface for receiving a passenger and a rear side surface arranged opposite the seat surface. The backrest element preferably comprises a head restraint and a backrest surface and is pivotable relative to the seat element between an upright position and an inclined position. Moreover, the passenger seat arrangement may comprise armrest elements which are pivotably arranged on the backrest element, wherein two armrest elements are preferably assigned to each seating unit.

The passenger seat arrangement may be provided such that the seat element of the seating unit in its resting position faces the backrest element, in particular bears thereagainst. More specifically, in the resting position of the seat element, the seat surface thereof faces the backrest surface of the backrest element and may be arranged substantially parallel thereto. Moreover, the passenger seat arrangement may be provided such that the seat element of the seating unit in its position of use is pivoted relative to the backrest element between an angle of 80° and 100°. In particular, the seat surface of the seat element in its position of use and the backrest surface of the backrest element in its upright position may form an angle of between 80° and 100°.

The passenger seat arrangement proposed here further comprises a support frame which bears the at least one seating unit and which is able to be connected in a load-bearing manner to a structure of the aircraft, in particular, a primary structure of the aircraft. More specifically, the support frame may be connected to an aircraft cabin floor, in particular a seat rail of the aircraft, for anchoring passenger seats in the passenger cabin. Alternatively or additionally, the support frame may be connected in a load-transmitting manner to a monument installed in the passenger cabin, in particular a side wall of the monument. For example, the support frame may be provided to be fastened to a side wall of a toilet module installed in the passenger cabin.

In a development, the support frame may comprise at least two support elements which may be connected in a load-transmitting manner to the structure of the aircraft. Preferably, two support elements are assigned to each seating unit of the passenger seat arrangement. The support elements may be configured such that the support elements pivotably mount the seat element and/or the backrest element of the seating unit. Moreover, the support elements may contain, in each case, a connecting element for fastening the passenger seat arrangement in a load-transmitting manner to the side wall of the monument installed in the passenger cabin. In other words, the connecting element permits forces acting on the passenger seat arrangement to be transmitted to the monument. Alternatively or additionally, the support elements may contain, in each case, a support foot for fastening the passenger seat arrangement in a load-transmitting manner to the aircraft cabin floor of the passenger cabin. The support foot is preferably configured such that, in a state of the passenger seat arrangement installed in the aircraft, the support foot extends substantially transversely to the aircraft cabin floor and, in particular, parallel to the side wall of the monument.

Since a passenger seat arrangement is provided with a support frame which is able to be fastened both to the aircraft cabin floor of the passenger cabin and to a monument installed therein, the forces transmitted via the support feet of the support frame may be reduced and thus a compact design of the support frame which is appropriate to the load may be achieved. For example, in the state of the passenger seat arrangement installed in the aircraft, it is thus possible to prevent the support frame from extending inside a region below the seat element. In other words, by means of this embodiment, struts of the support frame which protrude into the region below the seat element may be dispensed with, whereby the space below the seat element may be utilized in a more efficient manner.

In the passenger seat arrangement provided here, the support frame has at least one mechanical interface which, in each case, is assigned to a seating unit and is designed to fasten different mutually exchangeable modular units in a releasable and load-transmitting manner to the support frame. In particular, the mechanical interface may be designed to fasten the different mutually exchangeable modular units in the region of the seating unit assigned to the mechanical interface. Preferably, the different mutually exchangeable modular units are able to be fastened to the support frame such that, in a mounted state of the modular units on the support frame, the modular units are arranged in a region facing the backrest surface of the backrest element.

The passenger seat arrangement proposed here provides a means for receiving different modular units and equipment which are able to be attached to the support frame via the mechanical interface in a releasable and load-transmitting manner. Thus, a passenger cabin provided with the passenger seat arrangement may be configured in a simple manner and may be adapted to different use requirements and passengers to be transported. The present solution permits modular units which are both structurally and functionally different, such as, for example, a storage container for equipment, a child seat, a wheelchair, etc., to be able to be fastened to the support frame. The passenger seat arrangement thus has a high degree of flexibility with regard to receiving different modular units.

In a development, the passenger seat arrangement may be configured and designed such that via the mechanical interface, different mutually exchangeable modular units may be fastened to the support frame, both in a state in which the seat element is pivoted in its resting position and in a state in which the seat element is pivoted in its position of use. To this end, in the state of the passenger seat arrangement installed in the aircraft, the mechanical interface may be accessible in the resting position of the seat element below the seat element and in the position of use of the seat element above the seat element, in particular via a region arranged between the seat element and the backrest element. For example, the seat element may be mounted in the support frame such that the seat element is spaced apart from a pivot axis, in particular a vertical pivot axis in the state of the passenger seat arrangement installed in the aircraft, and is pivotable about the pivot axis, wherein the mechanical interface may be arranged in the region of the pivot axis. In the position of use of the seat element in the state of the passenger seat arrangement installed in the aircraft, the seat element may be arranged below or substantially level with the mechanical interface and, in the resting position of the seat element, above the mechanical interface.

In particular, the mechanical interface may be an Isofix interface for an Isofix connection between the support frame and the different mutually exchangeable modular units. Generally, Isofix describes a fastening system for child seats in motor vehicles which is particularly reliable and easy to operate and in which a rigid connection is produced between a vehicle body and a child seat. This fastening system is standardized according to the ISO 13216 standard and represents an international standard for fitting child seats with standard fixings. In motor vehicles, the Isofix connection consists in the known manner of two standard retaining brackets attached on the vehicle side, so-called Isofix retaining brackets, to which standard latching arms, so-called Isofix latching arms, attached rigidly to a child seat are able to be latched via a click-in function. Since the mechanical interface is configured in the form of an Isofix interface, a fastening system which has been tested from the field of motor vehicles and which is particularly reliable and easy to operate may be provided in an aircraft for connecting the different mutually exchangeable modular units to the support frame.

The mechanical interface may comprise at least one first latching element which is designed to be releasably latched to a complementary second latching element attached to the different mutually exchangeable modular units, in order to fasten one of the different mutually exchangeable modular units in a load-transmitting manner to the support frame. In particular, the first latching element may be configured in the form of a retaining bracket fixedly attached to the support frame, in particular an Isofix retaining bracket, to which a latching arm, in particular an Isofix latching arm which forms the second latching element, and which is attached to the different mutually exchangeable modular units, is able to be latched. In other words, the retaining bracket on the support frame may be provided and designed to cooperate with a latching arm attached to the different mutually exchangeable modular units, in order to produce a load-transmitting connection between the support frame and the respective modular units.

A passenger system comprises a passenger seat arrangement with the above-described features and at least one modular unit which is fastened to the support frame of the passenger seat arrangement in a releasable and load-transmitting manner and which is exchangeable for a different modular unit.

The at least one modular unit may, for example, be a child restraint system which provides a means for seating in the aircraft adapted to the small body size of children and babies, for increasing the passive safety. Generally, the type of child restraint system used in an aircraft depends on the age of the child to be transported. For children below two years of age, generally it is prescribed that they should be either secured by means of an additional seat belt on the lap of the parents or secured by a seat belt on a separate seat by means of a child seat or baby carrier. For children above two years of age, generally no child restraint systems are prescribed. However, parents are recommended to carry and independently install a child seat or similar restraint systems as are used, for example, in motor vehicles. Until now, however, a compatibility of such restraint systems for use in aircraft and the secure installation thereof have not been ensured.

Since in the present case the mechanical interface is provided on the support frame, a standardized fastening system which is reliable and easy to operate, and which permits the fastening of different child restraint systems to the support frame may be provided. In particular, the use of an Isofix interface as a mechanical interface has the advantageous effect that by the standardized Isofix connection a plurality of commercially available child seats are compatible with the passenger seat arrangement, parents already having full confidence in the installation of the child seats.

The at least one modular unit may alternatively or additionally be a wheelchair, in particular a wheelchair provided for use on board an aircraft. Generally, the transport of passengers with limited mobility inside the passenger cabin takes place by means of wheelchairs which are designed specifically therefor and which due to their compact design are easy to operate inside the passenger cabin. Generally, a passenger with limited mobility is initially conveyed by means of such a wheelchair inside the passenger cabin to his/her seat and then moved from the wheelchair onto his/her passenger seat of standard design. Depending on the degree of limited mobility of the passenger, this may result in enormous effort for crew members on board the aircraft. During operation of the aircraft, such wheelchairs may be subsequently stowed in storage containers inside the passenger cabin provided therefor.

Since the passenger seat system proposed here permits a fastening of a wheelchair to the support frame of the passenger seat arrangement, repositioning a passenger with limited mobility from a wheelchair to a standard passenger seat, which requires a high level of effort, is no longer required. A stowage area for the wheelchair during the flight of the aircraft also does not have to be provided, which leads to an efficient use of the space provided in the passenger cabin.

Alternatively or additionally, the at least one modular unit may be a transport box for animals. Animals are generally carried inside the passenger cabin such that an animal which is carried is stowed in a transport box which has to be arranged below a passenger seat during the entire flight of the aircraft. The possibility of an animal being carried inside the passenger cabin in this case is limited by the weight, the size and type of animal which is carried. Accordingly, animals which have a body weight of more than 10 kg or exceed a maximum size have to be transported in transport boxes provided therefor inside a cargo hold of the aircraft. Specific types of animal, such as for example horses, require specific care during the flight so that these animals have to be positioned inside the passenger cabin. Specific transport devices have to be provided therefor inside the passenger cabin.

Since the passenger seat system proposed here permits a fastening of a transport box for animals to the support frame of the passenger seat arrangement, larger animals and/or particularly care-intensive animals may also be transported inside the passenger cabin with less effort.

In a development, the passenger seat arrangement may be provided to receive different types of modular units. For example, the passenger seat arrangement may be provided to receive modular units of a first type which may be fastened in the position of use of the seat element to the support frame of the passenger seat arrangement. Alternatively or additionally, the passenger seat arrangement may be provided to receive modular units of a second type which are able to be fastened in the resting position of the seat element to the support frame of the passenger seat arrangement. Accordingly, the at least one modular unit may comprise at least one first modular unit, in particular a child restraint system, which is fastened to the support frame of the passenger seat arrangement in a state in which the seat element is pivoted in its position of use, so that the first modular unit is arranged in a mounted state on the seat element. In other words, the first modular unit may bear against the seat surface of the seat element and, in the state of the passenger seat arrangement installed in the aircraft, may be arranged in the longitudinal direction of the aircraft in front of the backrest element.

Moreover, the at least one modular unit may comprise a second modular unit, in particular a wheelchair or a transport box for animals, which is fastened to the support frame of the passenger seat arrangement in a state in which the seat element is pivoted in its resting position so that in a mounted state the second modular unit is arranged in a region in front of the seat element and the backrest element. In other words, in the mounted state of the passenger seat arrangement, the second modular unit may be fastened to the passenger seat arrangement such that the second modular unit is arranged in the longitudinal direction of the aircraft in front of the seat element and the backrest element. Accordingly, in this state the second modular unit may face the rear side surface of the seat element and the backrest surface of the backrest element.

An aircraft cabin region comprises a passenger seat arrangement which has the features described above and which is connected in a load-transmitting manner via the support frame to an aircraft cabin floor, in particular a seat rail. The aircraft cabin region also comprises a monument with a side wall, the passenger seat arrangement being connected thereto in a load-transmitting manner via the support frame.

BRIEF DESCRIPTION OF THE DRAWINGS

Preferred exemplary embodiments of the invention are described in more detail hereinafter with reference to the accompanying schematic drawings, wherein.

DETAILED DESCRIPTION OF THE PREFERRED EMBODIMENTS

Figure 1:
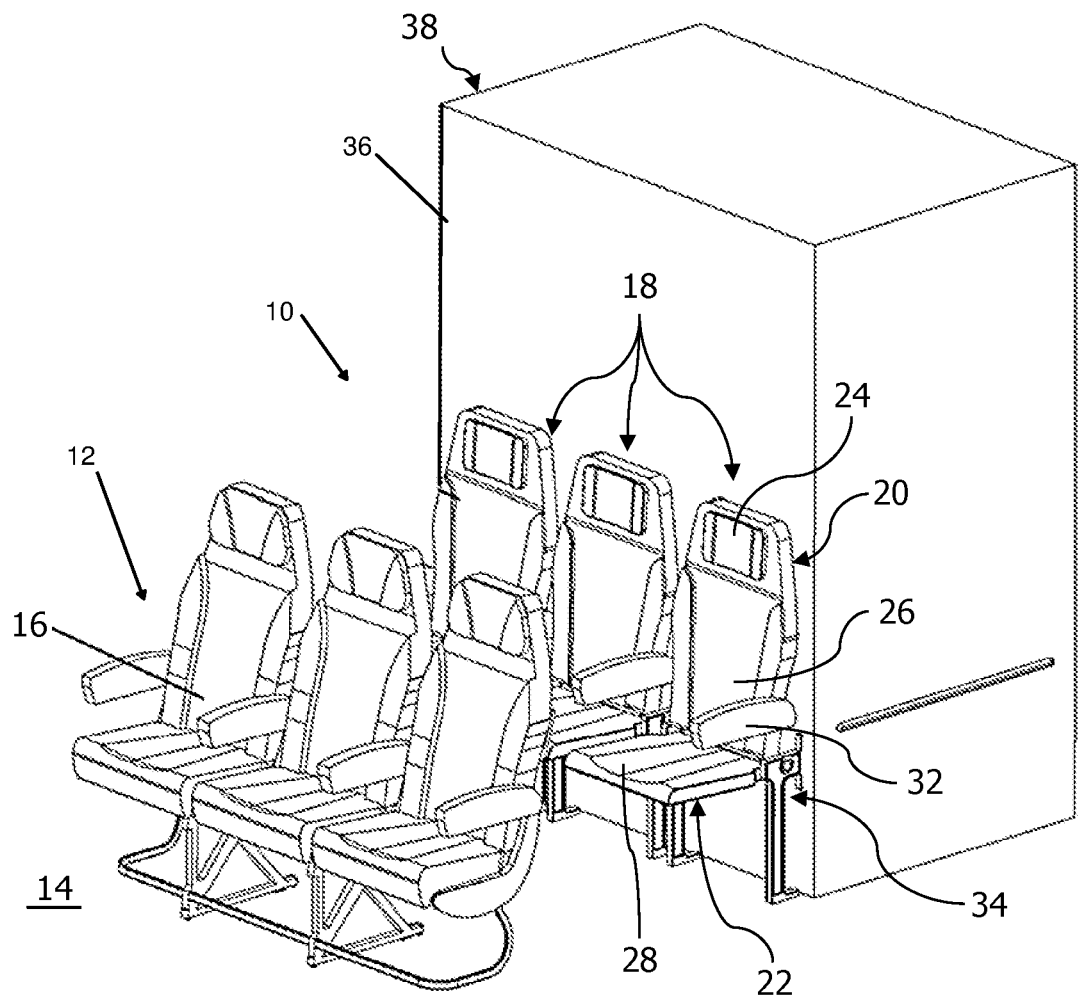
FIG. 1 shows a perspective view of an aircraft cabin region having a passenger seat arrangement.

FIG. 1 shows an aircraft cabin region of a passenger cabin which comprises a passenger seat arrangement 10 according to the invention and a standard seat bench 12 which is arranged in the longitudinal direction of the aircraft at the front thereof and which, in each case, forms a seat row in the passenger cabin of the aircraft. The standard seat bench 12 is connected in a load-transmitting manner to an aircraft cabin floor 14 of the aircraft via a seat rail, not shown here, and has three seats 16 for passengers arranged adjacent to one another.

Figure 2:
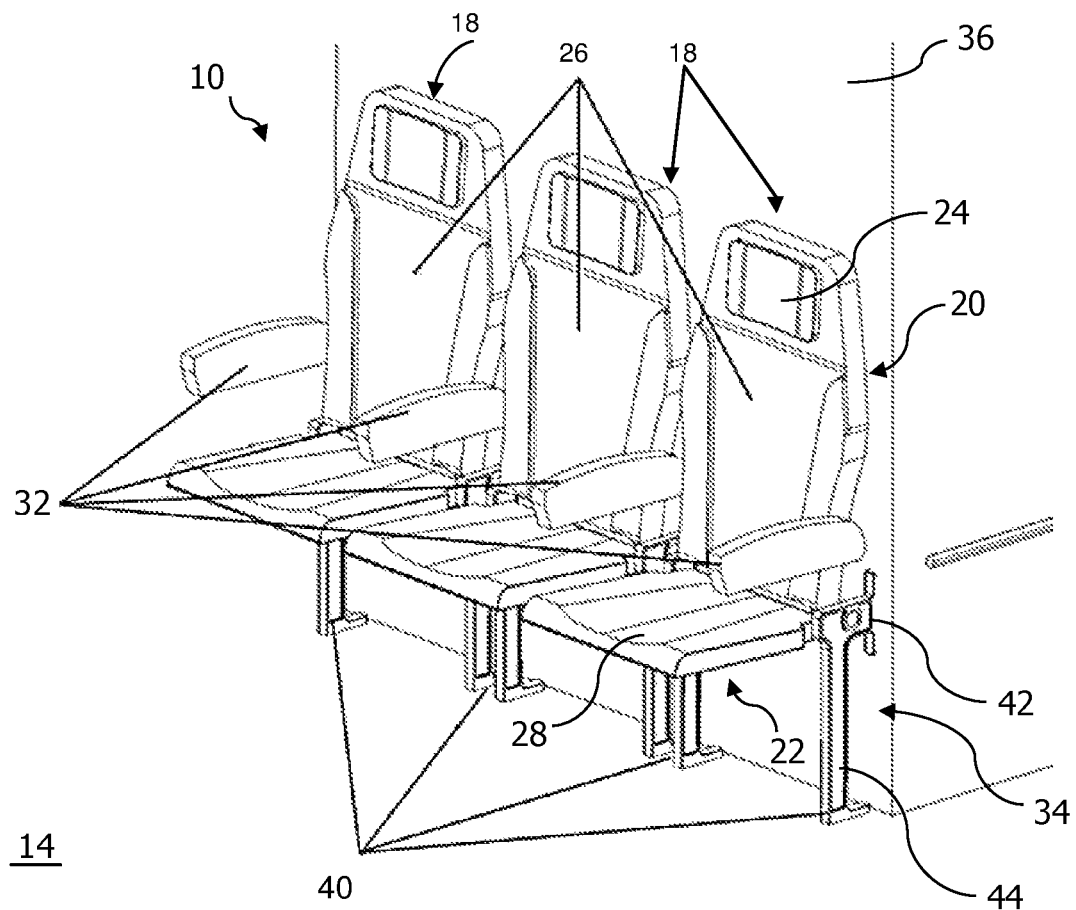
FIG. 2 shows an enlarged view of the passenger seat arrangement shown in FIG. 1.
Figure 3:
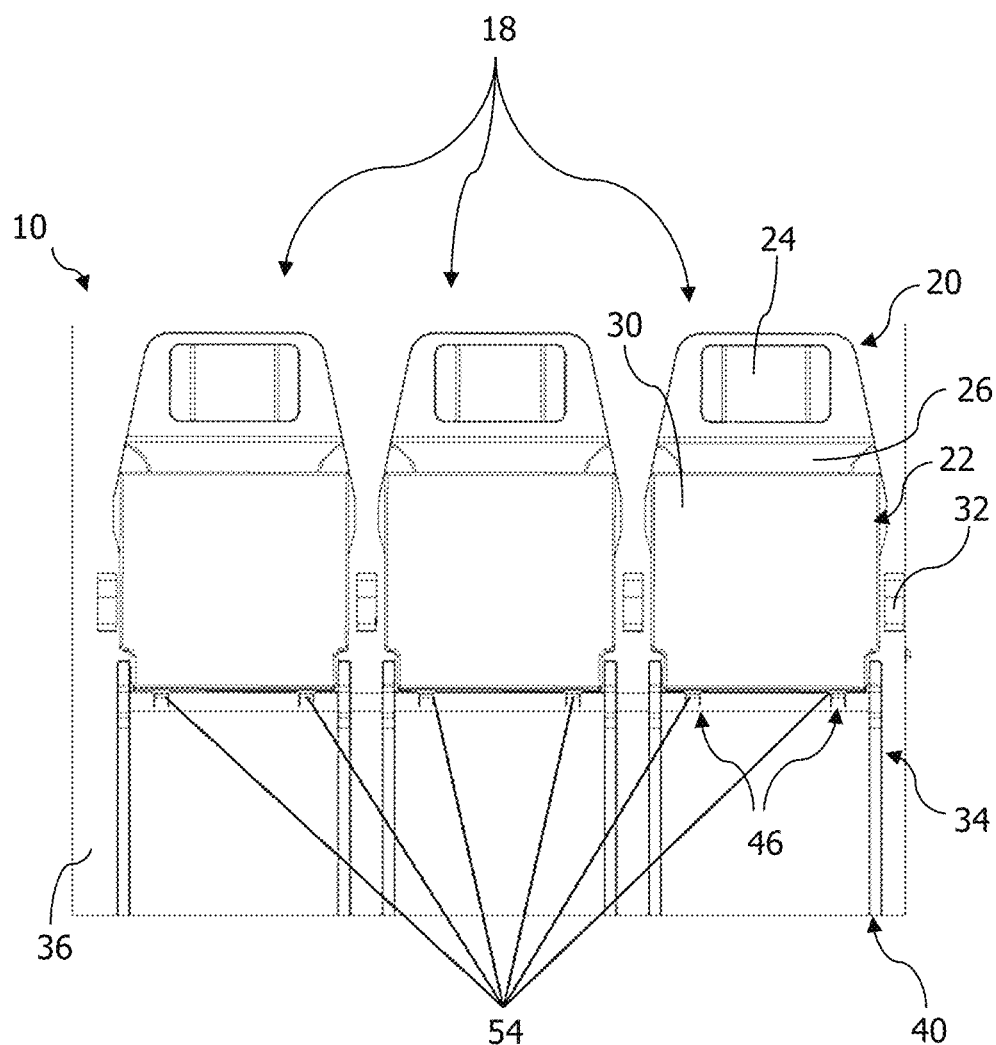
FIG. 3 shows a front view of the passenger seat arrangement shown in FIGS. 1 and 2.
Figure 4:
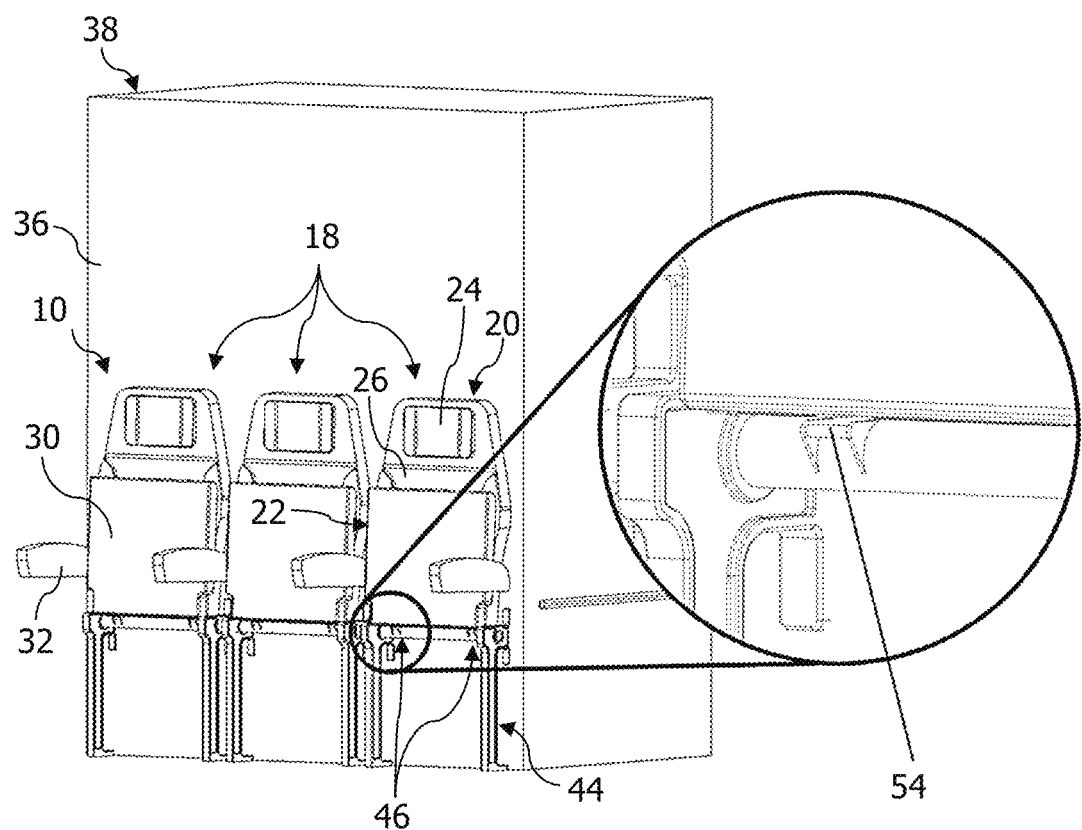
FIG. 4 shows an enlarged view of a mechanical interface of the passenger seat arrangement shown in FIGS. 1 to 3, FIGS. 5 and 6 show a perspective view of the passenger seat arrangement according to FIGS. 1 to 4 with a child restraint system fastened thereto.

The passenger seat arrangement 10 comprises three seating units 18 arranged adjacent to one another, in each case a passenger being able to be seated thereon during the operation of the aircraft. The seating units 18, in each case, comprise a backrest element 20 and a seat element 22 which is pivotable relative to the backrest element 20 between a resting position as shown in FIGS. 3 and 4 and a position of use, as shown in FIGS. 1 and 2. The backrest element 20 is pivotable relative to the seat element 22 between an upright position and a reclined position and comprises a head restraint 24 and a backrest surface 26. The support element 22 comprises a seat surface 28 for receiving the passenger and a rear side face 30 arranged opposite the seat surface 28, as shown in FIG. 3. The passenger seat arrangement 10 also comprises armrest elements 32 which are mounted on the backrest element 20 so as to be pivotable between a position of use and a stowed position, wherein two armrest elements 32 are assigned to each seating unit 18, one thereof being arranged to the left and the other thereof being arranged to the right of the backrest surface 26. In the exemplary embodiment shown here, the passenger seat arrangement 10 comprises four armrest elements 32, wherein armrest elements 32 arranged between the seating units 18 in each case are assigned to two seating units 18.

In the resting position of the seat element 22, the seat surface 28 thereof faces the backrest element 20 and at least partially bears thereagainst. More specifically, in the resting position of the seat element 22, the seat surface 28 thereof faces the backrest surface 26 of the backrest element 20 and is arranged substantially parallel thereto. In the position of use of the seat element 22 the seat surface 28 is pivoted relative to the backrest element 20 in the upright position or reclined position thereof, between an angle of 80° and 100°.

The passenger seat arrangement 10 further comprises a support frame 34 which bears the seating units 18 and which is able to be connected in a load-transmitting manner to a structure of the aircraft. In the exemplary embodiment shown here, the passenger seat arrangement 10 is connected in a load-transmitting manner via the support frame 34 to the aircraft cabin floor 14 and to a side wall 36 of a monument 38 of the aircraft cabin region installed in the passenger cabin. The support frame 34 may be at least partially connected in a load-transmitting manner to the seat rail in the aircraft cabin floor 14. The monument 38 may be, in particular, a toilet module installed in the passenger cabin.

As shown in FIG. 2, the support frame 34 comprises, for each seating unit 18, two support elements 40 connected in a load-transmitting manner to the aircraft cabin floor 14 and the side wall 36 of the monument 38 of the aircraft. The two support elements 40 provided for each seating unit 18 are configured such that they pivotably mount the seat element 22 and the backrest element 20 of the seating unit 18. The support elements 40 are designed such that they are able to receive both the load of a passenger seat and a load of an element which may be alternatively docked thereto, such as, for example, a transport box or a wheelchair. The support elements 40 are configured to be L-shaped. More specifically, the support elements 40 in each case comprise a connecting portion 42 which forms a shorter limb of the L-shaped support element 40 for fastening the passenger seat arrangement 10 to the side wall 36 of the monument 38 in a load-transmitting manner and a support foot 44 which forms a longer limb of the L-shaped support element 40 for fastening the passenger seat arrangement 10 to the aircraft cabin floor 14 in a load-transmitting manner. In the state of the passenger seat arrangement 10 installed in the aircraft, the support foot 44 of the support elements 40 extends substantially transversely to the aircraft cabin floor 14 and substantially parallel to the side wall 36 of the monument 38.

The support frame 34 of the passenger seat arrangement 10 further comprises three mechanical interfaces 46 which are assigned to one respective seating unit 18. The mechanical interfaces 46 are designed to fasten different mutually exchangeable modular units 48, 50, 52, as shown in FIGS. 5 to 10, in a releasable and load-transmitting manner to the support frame 34. In particular, the mechanical interfaces 46 are designed to fasten the different mutually exchangeable modular units 48, 50, 52 in the region of the seating unit 18 assigned to the respective mechanical interface 46 so that, in a mounted state of the modular units 48, 50, 52 on the support frame 34, these modular units are arranged in a region facing the backrest surface 26 of the backrest element 20.

Figure 5:
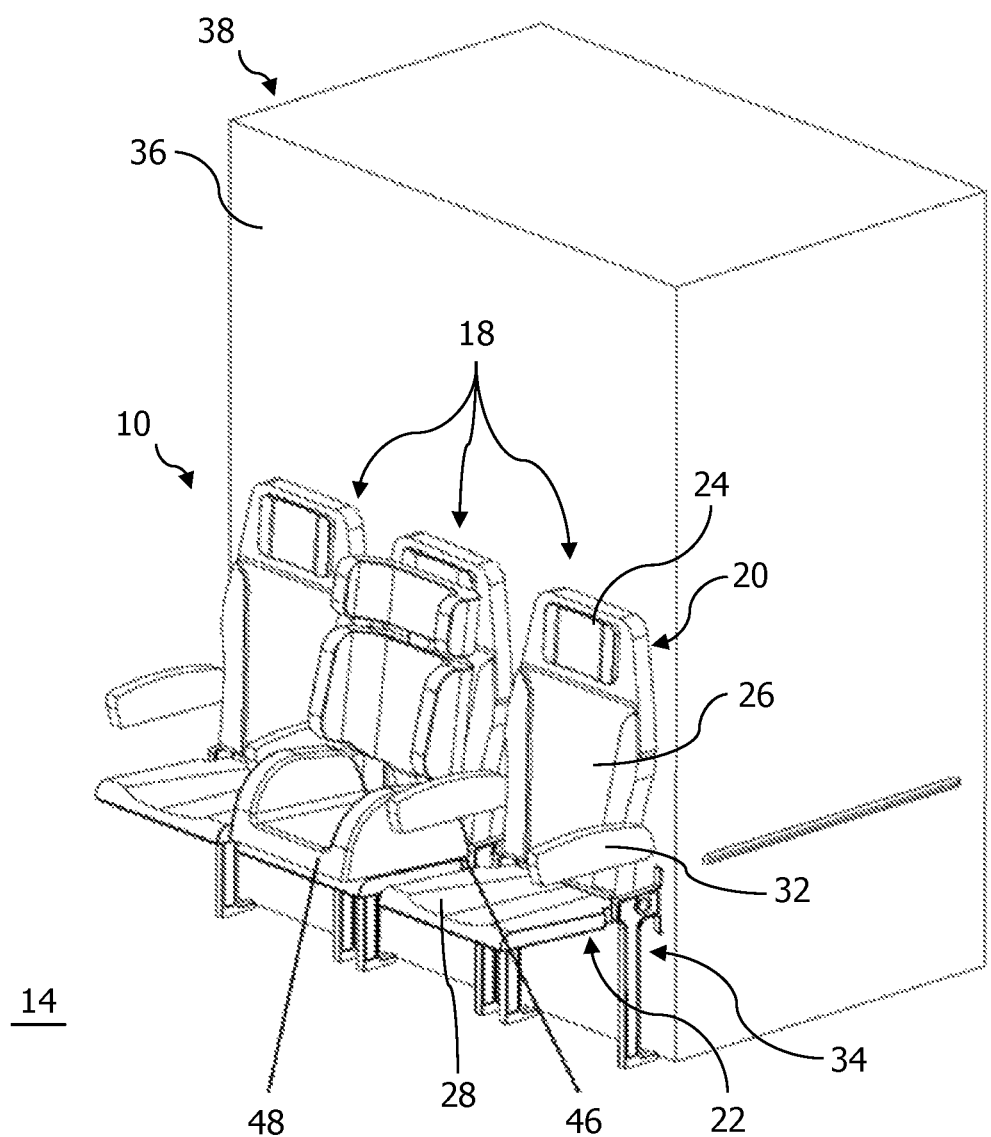
Figure 6:
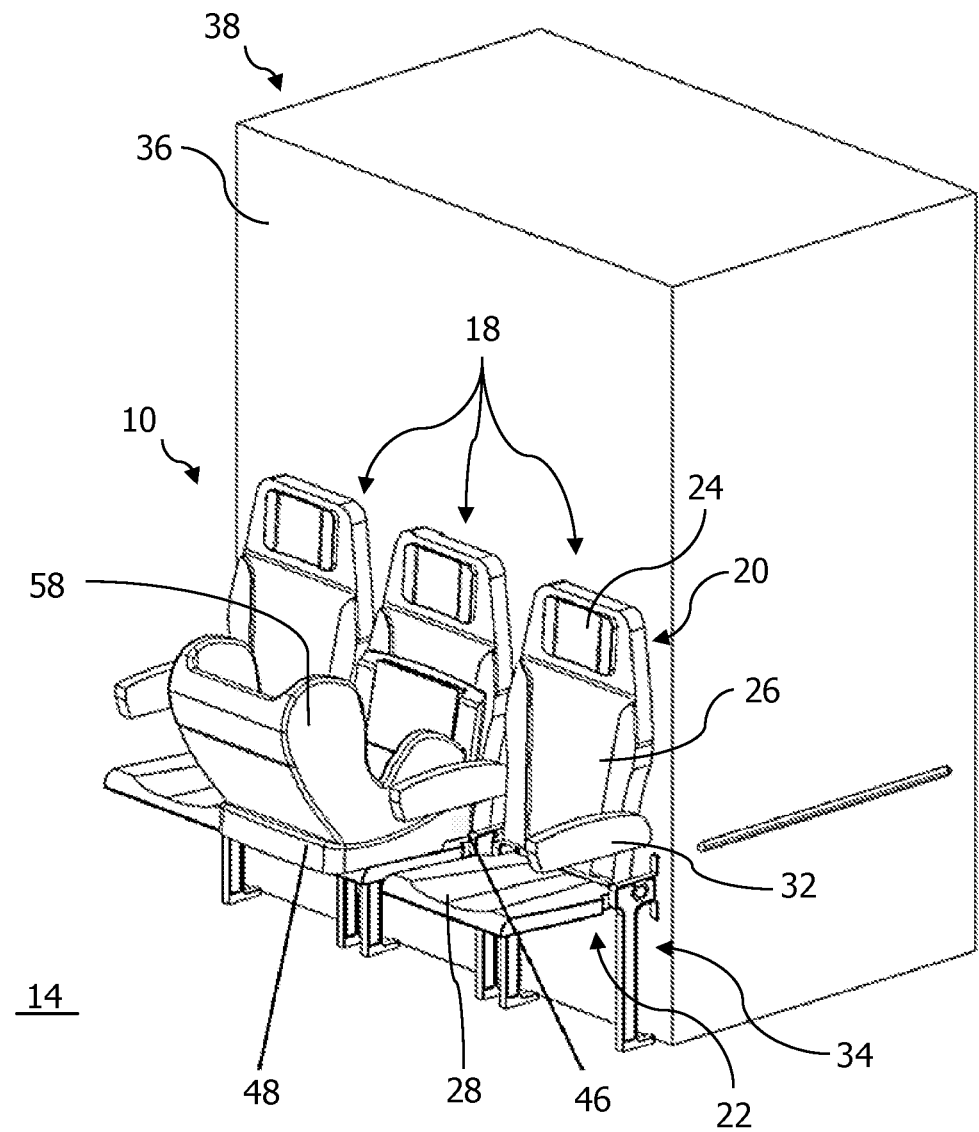

The passenger seat arrangement 10 is configured and designed such that via the mechanical interfaces 46 different mutually exchangeable modular units 48, 50, 52 are able to be fastened to the support frame 34, both in a state in which the seat element 22 of the respective seating unit 18 is pivoted in its resting position as shown in FIGS. 5 and 6, and in a state in which the seat element 22 of the respective seating unit 18 is pivoted in its position of use as shown in FIGS. 7 to 10. To this end, the passenger seat arrangement 10 is configured such that in the resting position of the seat element 22, in each case the mechanical interfaces 46 of the seating units 18 assigned thereto are accessible below the respective seat element 22, and in the position of use of the seat element 22 the mechanical interfaces of the seating units 18 assigned thereto are accessible above the respective seat element 22. In particular, in the position of use of the seat element 22 the mechanical interfaces 46 of the seating units 18 assigned thereto are accessible via a region arranged between the respective seat element 22 and the respective backrest element 20. This embodiment is implemented in the present case by the seat element 22 of the respective seating unit 18 being spaced apart from a vertical pivot axis and being pivotably mounted about the pivot axis, wherein the mechanical interfaces 46 in each case are arranged in the region of this pivot axis, as shown in FIG. 4.

Figure 7:
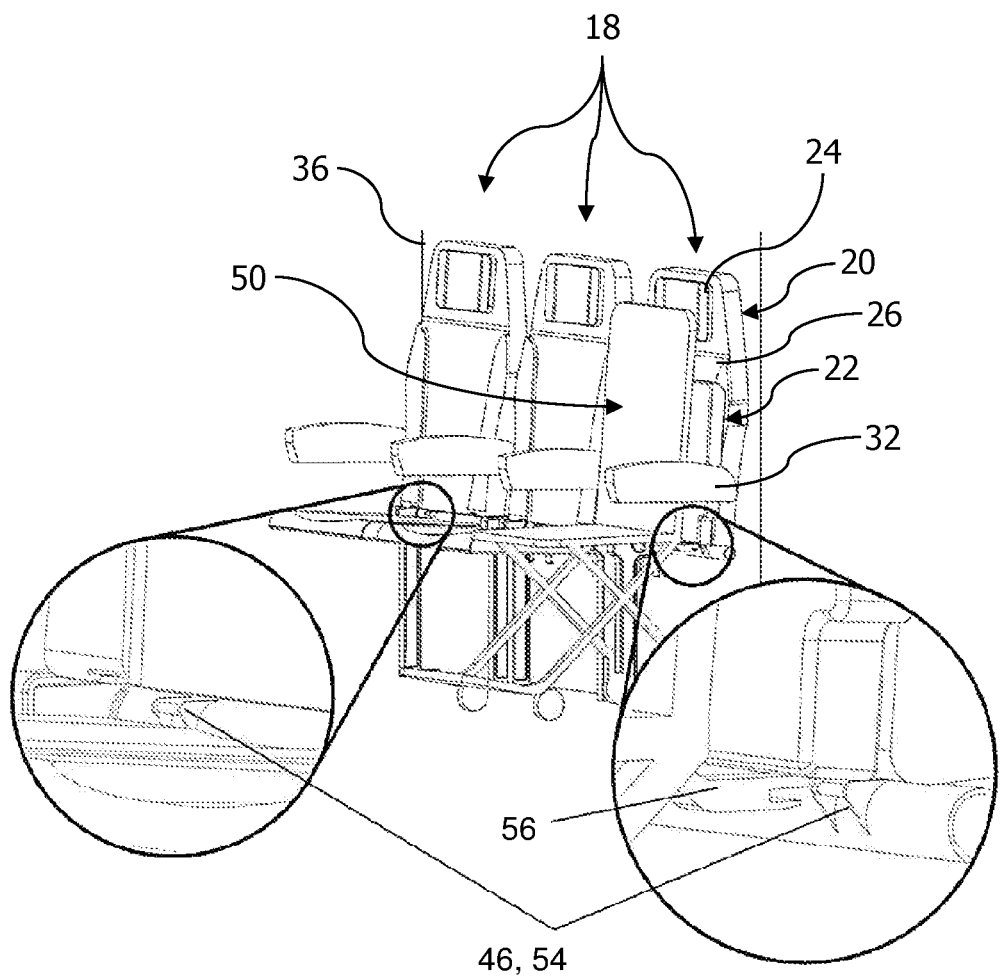
FIGS. 7 and 8 show a perspective view of the passenger seat arrangement according to FIGS. 1 to 4 with a wheelchair fastened thereto.

The mechanical interfaces 46, in each case, are configured in the form of an Isofix interface for an Isofix connection between the support frame 34 and the different mutually exchangeable modular units 48, 50, 52. The respective mechanical interface 46 assigned to a seating unit 18 comprises in each case two first latching elements 54 as shown in FIGS. 3, 4 and 7. The first latching elements 54 in each case are designed to be releasably latched to a complementary second latching element 56 attached to the different mutually exchangeable modular units 48, 50, 52 as shown in enlarged views in FIG. 7, in order to fasten one of the different mutually exchangeable modular units 48, 50, 52 in a load-transmitting manner to the support frame 34. More specifically, the first latching element 54 is in the form of a retaining bracket which is fixedly attached to the support frame 34, in particular an Isofix retaining bracket, to which a latching arm, in particular an Isofix latching arm which forms the second latching element 56 and which is attached to the different mutually exchangeable modular units 48, 50, 52, is able to be latched.

Figure 8:
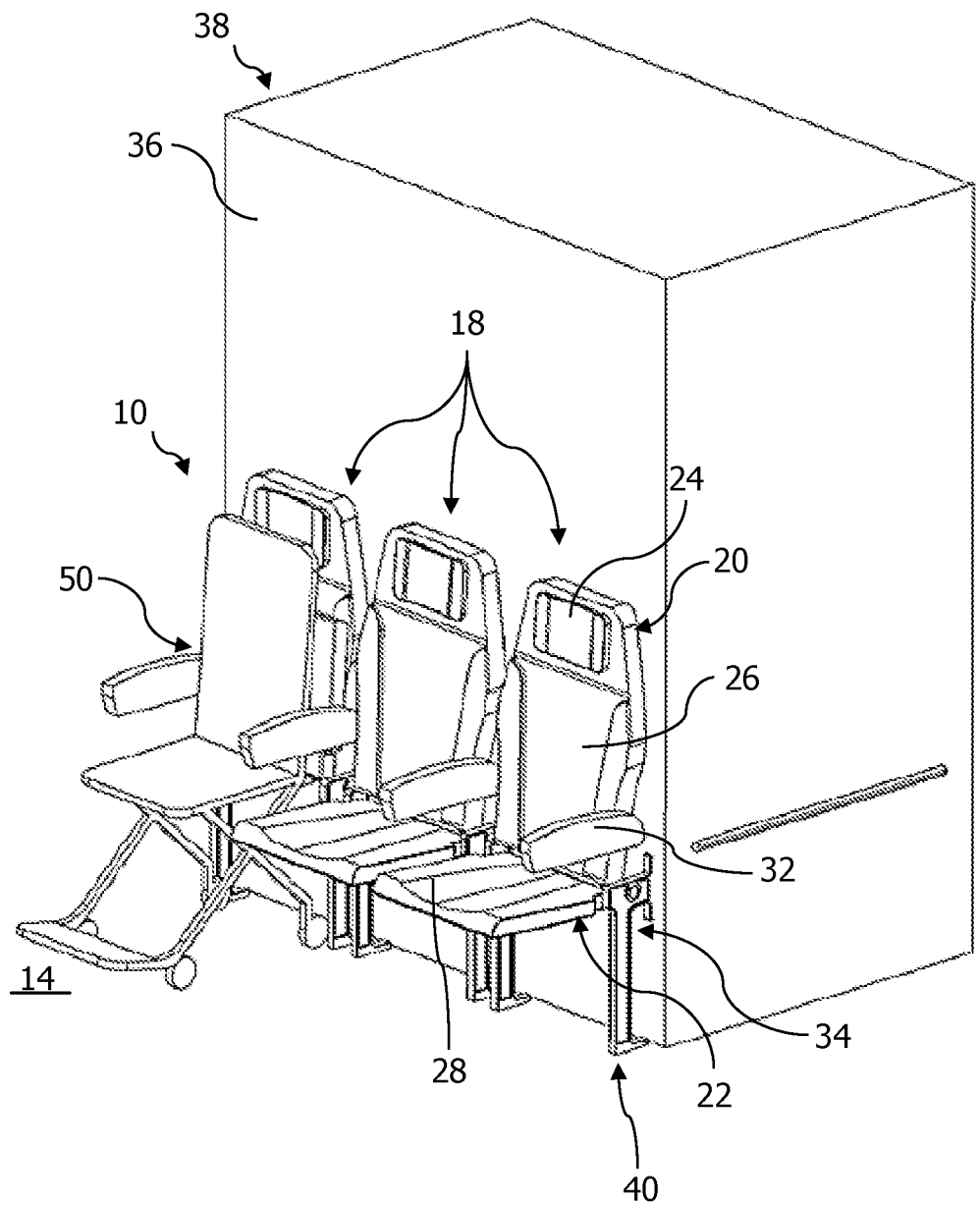
Figure 9A:
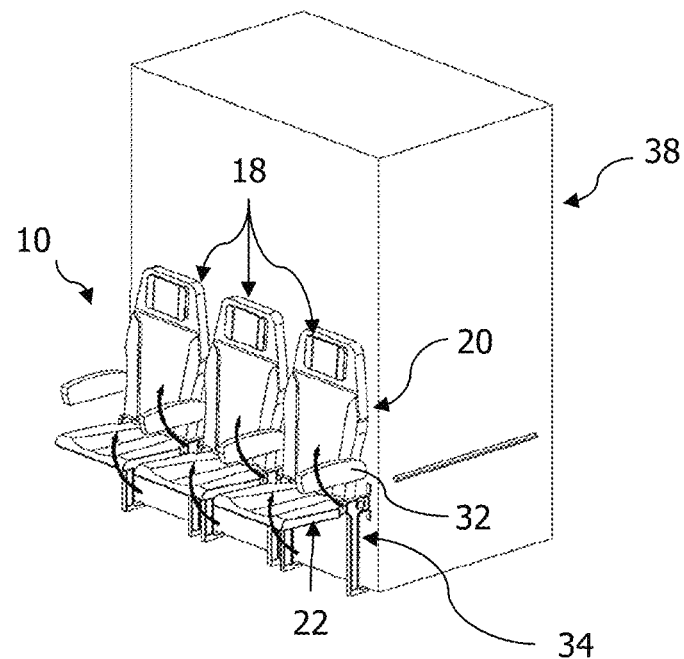
FIGS. 9a to 9f show a method for fastening the wheelchair shown in FIGS. 7 and 8 to the passenger seat arrangement according to FIGS. 1 to 4.
Figure 9B:
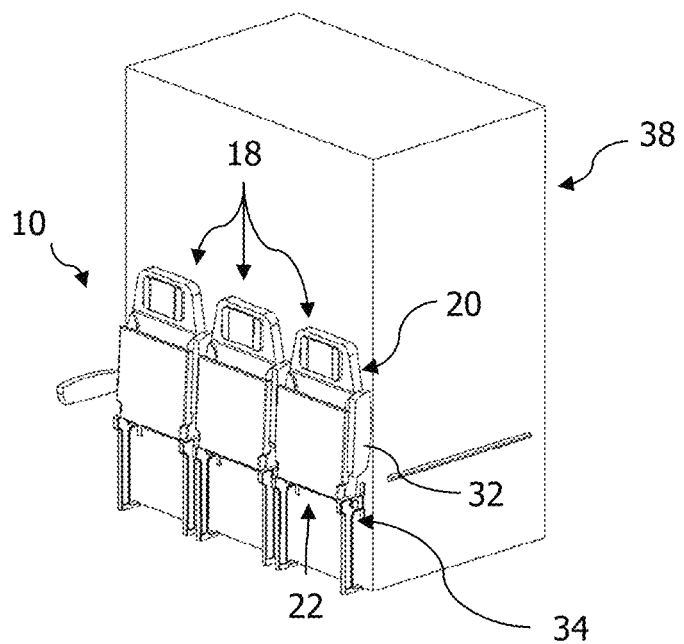
Figure 9C:
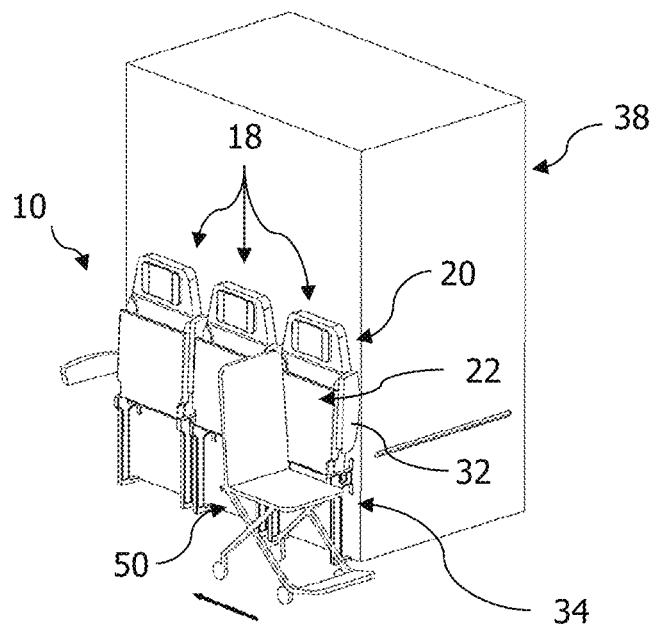
Figure 9D:
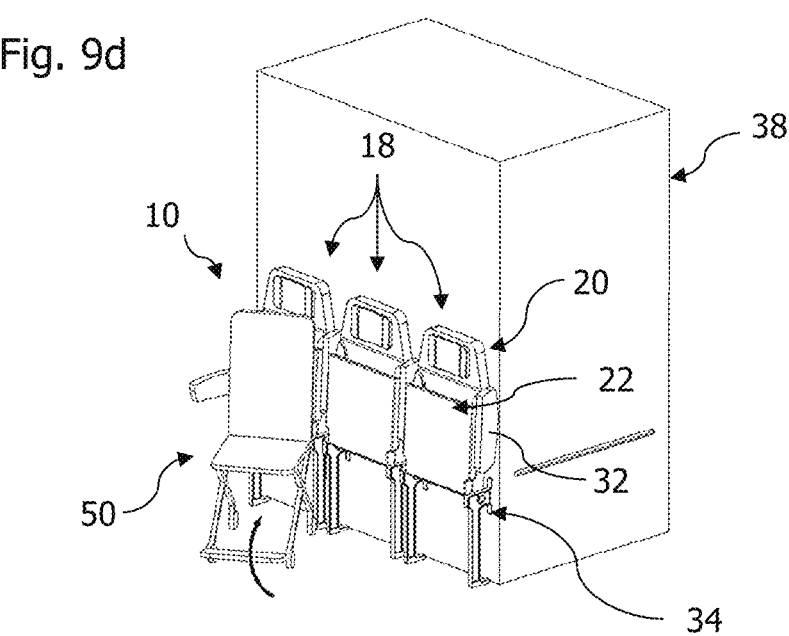
Figure 9E:
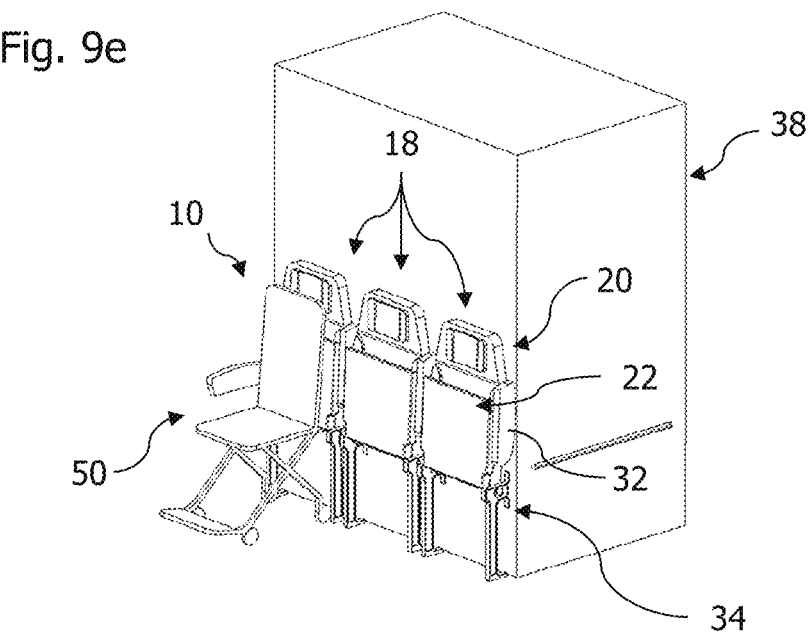
Figure 9F:
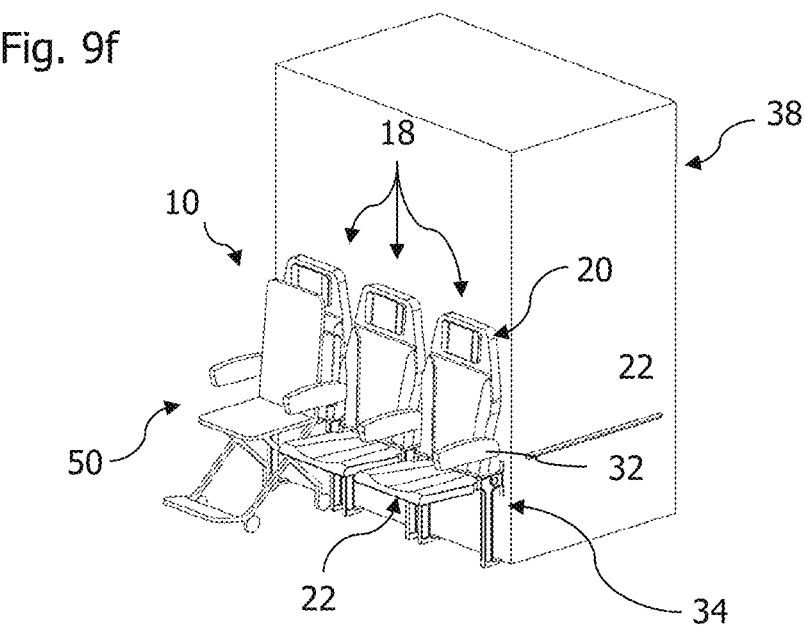
Figure 10:
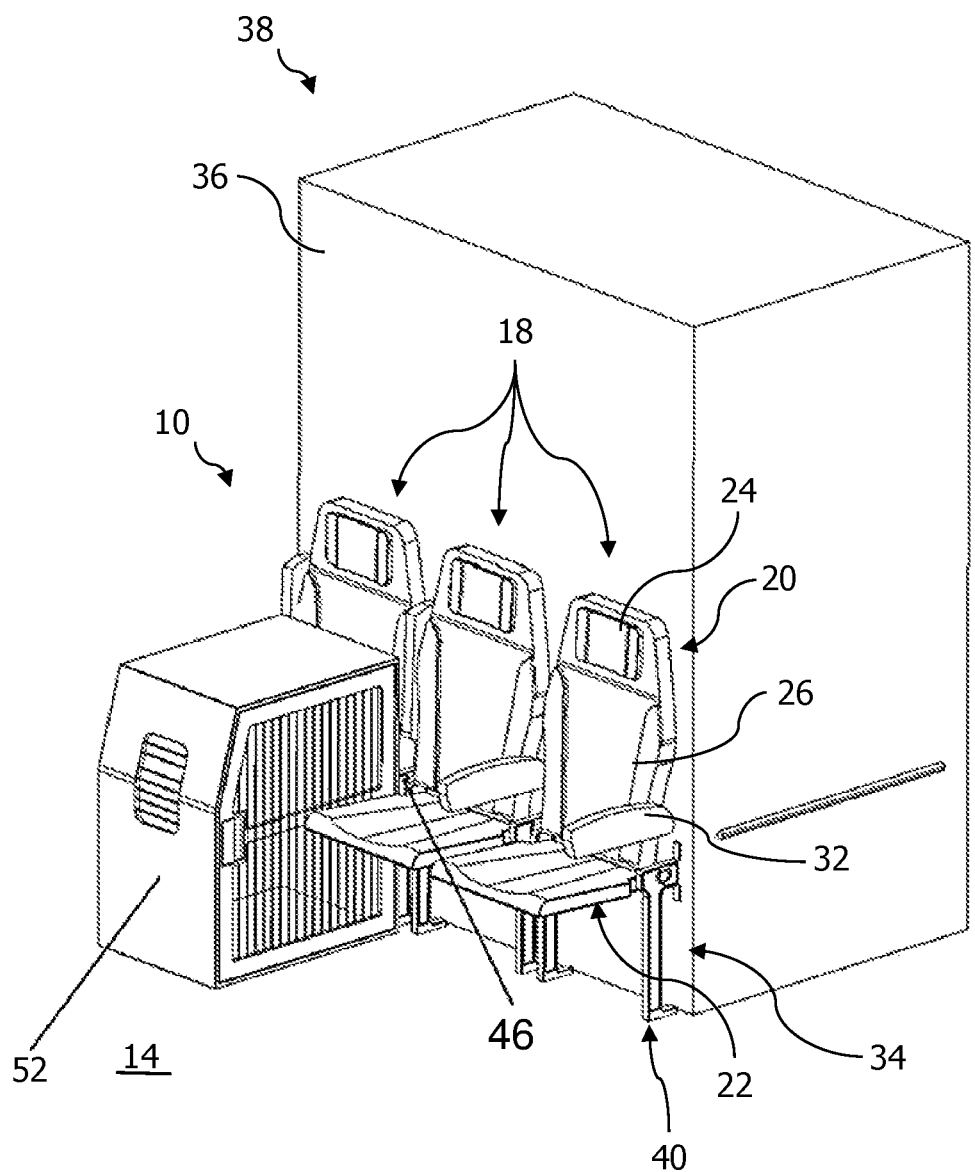
FIG. 10 shows a perspective view of the passenger seat arrangement according to FIGS. 1 to 4 with a transport box for animals fastened thereto.

FIGS. 5 to 10 show a passenger seat system having a passenger seat arrangement 10 as described above and at least one modular unit 48, 50, 52 which is fastened to the support frame 34 of the passenger seat arrangement 10 in a releasable and load-transmitting manner and which is exchangeable for a different modular unit 48, 50, 52. The at least one modular unit 48, 50, 52 comprises a child restraint system 48 as shown in FIGS. 5 and 6, a wheelchair 50 as shown in FIGS. 7 to 9 and/or a transport box 52 for animals as shown in FIG. 10.

The passenger seat arrangement 10 in the present case is provided to receive different types of modular units. Specifically, the passenger seat arrangement 10 is provided to receive at least one modular unit 48 of a first type which is able to be fastened in the position of use of the seat element 22 to the support frame 34 of the passenger seat arrangement 10. Moreover, the passenger seat arrangement 10 is provided to receive at least one modular unit 50, 52 of a second type which, in the resting position of the seat element 22, is able to be fastened to the support frame 34 of the passenger seat arrangement 10. Accordingly, the at least one modular unit 48, 50, 52 of the passenger seat system comprises at least one first modular unit in the form of a child restraint system 48, as shown in FIGS. 5 and 6, which is fastened to the support frame 34 of the passenger seat arrangement in a state in which the seat element 22 is pivoted in its position of use so that in a mounted state the child restraint system 48 is arranged on the seat element 22. In this state, the child restraint system 48 bears against the seat surface 28 of the seat element 22 and in the longitudinal direction of the aircraft is arranged in front of the backrest element 20 and facing the backrest element. FIG. 5 shows a child restraint system 48 in the form of a child seat, in a mounted state the backrest thereof bearing against the backrest surface 26 of the back element 20. The child seat is preferably a commercially available child seat which, for example, is designed for use in motor vehicles. FIG. 6 shows a child restraint system 48 in the form of a baby carrier in which, in the state mounted on the support frame 34, the backrest 58 thereof is arranged opposite the backrest element 20 of the seating unit 18. The baby carrier is preferably a commercially available baby carrier which, for example, is designed for use in motor vehicles.

Moreover, the at least one modular unit 48, 50, 52 of the passenger seat system comprises at least two second modular units in the form of a wheelchair 50 and a transport box 52 for animals which are fastened to the support frame 34 of the passenger seat arrangement 10 in a state, as shown in FIGS. 7 to 10, in which the seat element 22 is pivoted in its resting position, so that in a mounted state these modular units are arranged in a region in front of the seat element 22 and the backrest element 20. In order to ensure a reliable fastening of the second modular units to the support frame 34 of the passenger seat arrangement 10, the support frame 34 comprises on the support feet 44 of the support elements 40 in each case further latching elements, not shown here, in the region of the aircraft cabin floor 14, the further latching elements being able to be latched to latching elements which are complementary thereto on the second modular units.

With reference to FIGS. 9a to 9f, a method for fastening a wheelchair 50 to the support frame 34 of the passenger seat arrangement 10 is described hereinafter. In a first step shown in FIG. 9a, the seat elements 22 of each seating unit 18 are pivoted in the resting position thereof, the backrest elements 20 are pivoted in the upright position thereof and the armrest elements 32 are pivoted in the stowed position thereof. In this manner, a space is opened up in the longitudinal direction in front of the passenger seat arrangement 10, which forms a corridor between the passenger seat arrangement 10 and the standard seat bench 12. As shown in FIG. 9b, it is not necessary to pivot an armrest element 32 of the passenger seat arrangement 10 furthest away from a central aisle of the aircraft into its stowed position. As shown in FIG. 9c, the wheelchair 50 is subsequently pushed via the central aisle of the aircraft backwards into the corridor formed between the passenger seat arrangement 10 and the standard seat bench 12 until it reaches the desired seating unit 18, the wheelchair 50 being able to be fastened in the region thereof to the support frame 34 of the passenger seat arrangement 10. In the step shown in FIGS. 9d and 9e, the wheelchair 50 is fastened to the support frame 34 of the passenger seat arrangement 10, such that the latching arms 56 configured on the wheelchair 50 are latched to the retaining brackets 54 configured on the support frame 34.

Finally, the armrest elements 32 and the seat elements 22 of the seating units 18, which are arranged adjacent to the seating unit 18 coupled to the wheelchair 50, are pivoted in their position of use, as shown in FIG. 9f.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat arrangement for installation in an aircraft, comprising:
    at least one seating unit comprising a backrest element and a seat element which is pivotable relative to the backrest element between a resting position and a position of use; and
    a support frame which bears the at least one seating unit and which is configured to be connected in a load-bearing manner to a structure of the aircraft,
    wherein the support frame has at least one mechanical interface which is assigned to a seating unit and is configured to fasten different mutually exchangeable modular units in a releasable and load-transmitting manner to the support frame.

2. The passenger seat arrangement according to claim 1, wherein the seat element of the seating unit in its resting position faces the backrest element and bears thereagainst, and in its position of use is pivoted relative to the backrest element between an angle of 80° and 100°.

3. The passenger seat arrangement according to claim 1, wherein the support frame is configured to be connected in a load-transmitting manner to at least one of an aircraft cabin floor of a passenger cabin of the aircraft or a monument installed in the passenger cabin.

4. The passenger arrangement according to claim 3, wherein the support frame is configured to be connected to at least one of a seat rail of the aircraft or a side wall of the monument.

5. The passenger seat arrangement according to claim 1, wherein the support frame comprises at least two support elements which are configured to be connected in a load-transmitting manner to the structure of the aircraft and which pivotably mount at least one of the seat element or the backrest element of the seating unit.

6. The passenger seat arrangement according to claim 5, wherein the at least two support elements in each case comprise at least one of:
    a connecting element configured to fasten the passenger seat arrangement in a load transmitting manner to a side wall of a monument installed in a passenger cabin; or
    a support foot configured to fasten the passenger seat arrangement in a load-transmitting manner to an aircraft cabin floor of the passenger cabin of the aircraft,
    wherein, in a state of the passenger seat arrangement installed in the aircraft, the support foot extends substantially transversely to the aircraft cabin floor.

7. The passenger seat arrangement according to claim 6, wherein, the support foot extends parallel to the side wall of the monument.

8. The passenger seat arrangement according to claim 1, wherein in a state of the passenger seat arrangement as installed in the aircraft, the mechanical interface is accessible in the resting position of the seat element below the seat element and in the position of use of the seat element, the mechanical interface is accessible above the seat element.

9. The passenger seat arrangement according to claim 8, wherein in the position of use of the seat element, the mechanical interface is accessible via a region arranged between the seat element and the backrest element.

10. The passenger seat arrangement according to claim 1, wherein the mechanical interface is an Isofix interface for an Isofix connection between the support frame and the different mutually exchangeable modular units.

11. The passenger seat arrangement according to claim 1, wherein the mechanical interface comprises at least one first latching element configured to be releasably latched to a complementary second latching element attached to the different mutually exchangeable modular units to fasten one of the different mutually exchangeable modular units in a load-transmitting manner to the support frame.

12. The passenger seat arrangement according to claim 11, wherein the first latching element is configured as a retaining bracket, to which a latching arm which is attached to the different mutually exchangeable modular units, is able to be latched.

13. The passenger seat arrangement according to claim 12, wherein the retaining bracket comprises an Isofix retaining bracket fixedly attached to the support frame and the latching arm comprises an Isofix latching arm forming the second latching element.

14. A passenger seat system comprising:
a passenger seat arrangement according to claim 1, and
at least one modular unit fastened to the support frame of the passenger seat arrangement in a releasable and load-transmitting manner and exchangeable for a different modular unit.

15. The passenger seat system according to claim 14, wherein the at least one modular unit is at least one of a child restraint system, a wheelchair or a transport box for animals.

16. The passenger seat system according to claim 14, wherein the at least one modular unit comprises:
at least one first modular unit which is fastened to the support frame of the passenger seat arrangement in a state in which the seat element is pivoted in its position of use, so that the first modular unit is arranged on the seat element; or
at least one second modular unit which is fastened to the support frame of the passenger seat arrangement in a state in which the seat element is pivoted in its resting position so that in a mounted state the second modular unit is arranged in a region in front of the seat element and the backrest element.

17. The passenger seat system according to claim 16, wherein the at least one first modular unit comprises a child restraint system.

18. The passenger seat system according to claim 16, wherein the at least one second modular unit comprises at least one of a wheelchair or a transport box for animals.

19. An aircraft cabin region having a passenger seat arrangement according to claim 1, which is connected in a load-transmitting manner via the support frame to an aircraft cabin floor.

20. The aircraft cabin region according to claim 19, which further comprises a monument with a side wall to which the passenger seat arrangement is connected in a load-transmitting manner via the support frame.

* * * * *